United States Patent [19]
Kurakake et al.

[11] Patent Number: 4,719,400
[45] Date of Patent: Jan. 12, 1988

[54] MOTOR CONTROL APPARATUS

[75] Inventors: Mitsuo Kurakake, Hino; Keiji Sakamoto, Hachioji, both of Japan

[73] Assignee: Fanuc Ltd., Minamitsuru, Japan

[21] Appl. No.: 11,353

[22] PCT Filed: Oct. 19, 1983

[86] PCT No.: PCT/JP83/00364

§ 371 Date: Jun. 11, 1984

§ 102(e) Date: Jun. 11, 1984

[87] PCT Pub. No.: WO84/01677

PCT Pub. Date: Apr. 26, 1984

Related U.S. Application Data

[63] Continuation of Ser. No. 621,914, Jun. 11, 1984, abandoned.

[30] Foreign Application Priority Data

Oct. 19, 1982 [JP] Japan ............................ 57-183334

[51] Int. Cl.⁴ .............................................. H02P 5/40
[52] U.S. Cl. ........................................ 318/811; 363/56
[58] Field of Search .................. 363/37, 56, 41–43; 318/807–811, 803

[56] References Cited

U.S. PATENT DOCUMENTS

| | | | |
|---|---|---|---|
| 3,944,907 | 3/1976 | Weit | 363/57 |
| 4,051,418 | 9/1977 | O'Berto et al. | 363/56 |
| 4,451,771 | 5/1984 | Nagase et al. | 318/800 |
| 4,456,868 | 6/1984 | Yamamura et al. | 318/800 |
| 4,458,192 | 7/1984 | Sakamoto et al. | 318/811 |
| 4,459,534 | 7/1984 | Nagase et al. | 318/811 |
| 4,477,762 | 10/1984 | Karakake et al. | 318/811 |
| 4,481,457 | 11/1984 | Zach et al. | 318/811 |

Primary Examiner—David Smith, Jr.
Attorney, Agent, or Firm—Staas & Halsey

[57] ABSTRACT

A motor control apparatus including an arithmetic circuit (113) for calculating a current command, a holding circuit (118) for holding the current command, a pulse-width modulating circuit (114) for pulse-width modulating an output signal from the holding circuit (118) and provided with a dead zone with respect to the output signal, and a transistorized amplifier/converter circuit (117) for controlling a motor by the pulse-width modulated signal. The arithmetic circuit (113) adds a compensating signal, to the current command to compensate for motor control losses due to the dead zone, and delivers the result to the holding circuit (118).

6 Claims, 12 Drawing Figures

MOTOR CONTROL APPARATUS

This is a continuation of co-pending application Ser. No. 621,914 filed on June 11, 1984 abandoned.

BACKGROUND OF THE INVENTION

This invention relates to a motor control apparatus and, more particularly, to a motor control apparatus capable of preventing the dead zone of a pulse-width modulating circuit from causing a short circuit in an inverter circuit.

A control circuit for an AC or DC motor generally makes use of an arrangement, namely a pulse-width modulation drive circuit, for pulse-width modulating an AC or DC current command to drive an inverter circuit (a transistorized amplifier circuit) and for applying a pulse-width modulated sinusoidal or direct current to a motor. It is sufficient if the arrangement is capable of withstanding the high voltage required solely by the final stage of the inverter circuit, the circuit construction is thus simple and control is performed comparatively well.

In the case of direct current the inverter circuit has four transistors. For three-phase AC drive the inverter circuit has two transistors in each phase, for a total of six transistors, with control being such that when one of the transistors in each phase turns on, the other turns off. A transistor drive signal (a pulse-width modulated signal) is provided with dead time in such a manner that the two transistors in each phase will not be turned on simultaneously at the time of the changeover, that is, in such a manner that the DC power supply will not develop a short circuit. This dead time is set by providing a pulse-width modulating circuit with a dead zone. However, since the pulse-width modulated signal is provided with the dead time in this manner, the pulse width of the modulated signal is reduced and distortion is produced in the pulse-width modulated sinusoidal current or in the direct current. This results in certain disadvantages, namely greater excitation noise and torque irregularity, with the commanded torque originally not being obtained. In particular, in the case of operation at low speed, the sinusoidal current command takes on a low frequency, and pulse width is small with a direct current command of a low voltage. Accordingly, the influence of the dead zone is of such proportions as cannot be ignored.

As means for compensating for the dead zone there has been proposed a system in which the output voltage of the inverter circuit is fed back to a pre-stage of the pulse-width modulating circuit to raise the gain using this feedback loop. However, with an arrangement in which an arithmetic circuit such as a microprocessor is used as the motor control circuit, it is necessary to provide separate analog circuits for these feedback loops. The processing of these analog circuits cannot be performed by the arithmetic circuit, thereby resulting in a complicated construction and high cost.

SUMMARY OF THE INVENTION

Accordingly, an object of the present invention is to provide a motor control circuit which is capable of compensating for the influence of a dead zone in a pulse-width modulating circuit by using an arithmetic circuit.

Where a PWM circuit having a dead zone and a transistorized amplifier is used for controlling a motor, the present invention is arranged such that an arithmetic circuit for generating a current command also generates a compensating signal for offsetting the dead zone of the PWM circuit. This compensation signal is added to the current command and the result applied to a holding circuit.

According to the invention, loss of motor torque due to the influence of the PWM circuit dead zone can be prevented, and the elimination of loss ascribable to the dead zone can be carried out by processing performed by the arithmetic circuit.

DESCRIPTION OF THE PREFERRED EMBODIMENTS

Figure 1:
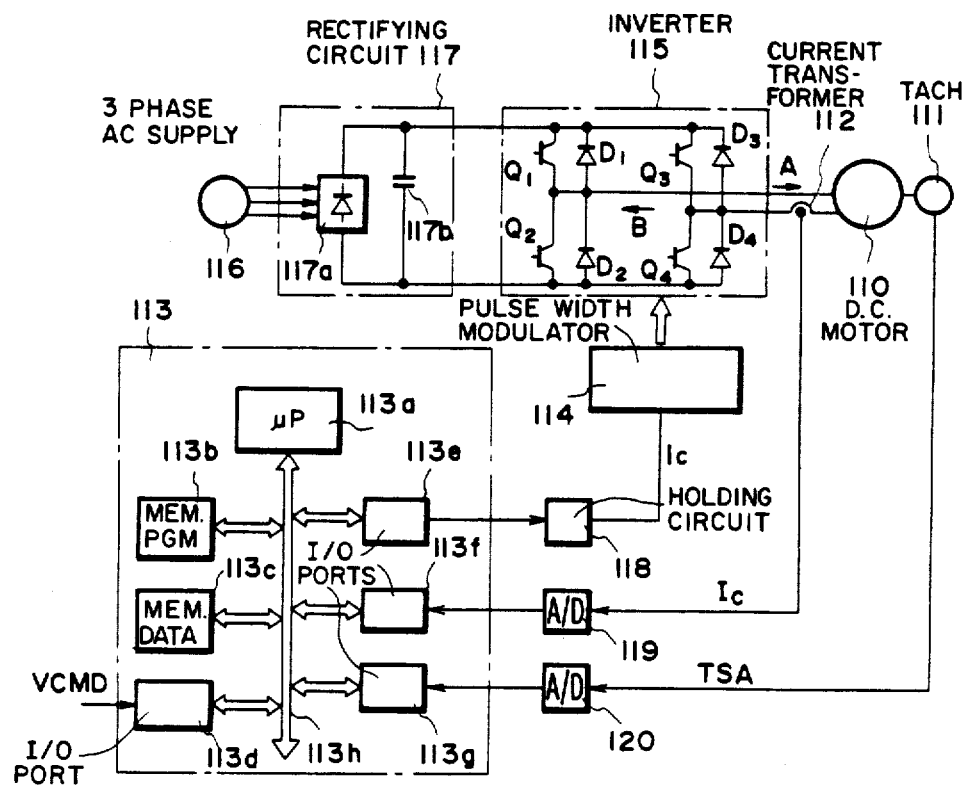
FIG. 1 is a block diagram of a first embodiment of the present invention.

The present invention will now be described in detail based on an embodiment thereof. FIG. 1 is a block diagram of a first embodiment of the present invention. In this Figure, numeral 110 denotes a DC motor, and numeral 111 denotes a tachogenerator for producing an actual velocity voltage TSA proportional to the rotational velocity of the motor 110. Numeral 112 denotes a current transformer for sensing the armature current Ic of the motor 110. Numeral 113 denotes an arithmetic circuit comprising a microprocessor and having a processor 113a for performing processing, a program memory 113b storing a motor control program executed by the processor 113a, a data memory 113c for storing data such as the results of processing, an input/output port 113d for exchanging data with an external main control unit, an input/output port 113e for delivering a current command ic to a pulse-width modulating circuit (hereafter referred to as a PWM circuit), an input/output port 113f which receives an armature current Ic from the current transformer 112, an input/output port 113g which receives the actual velocity voltage TSA of the tachogenerator 111, and an address/data bus 113h interconnecting the foregoing units. Numeral 114 denotes the pulse-width modulating circuit, numeral 115 denotes a transistorized amplifier, numeral 116 denotes a three-phase AC power supply, numeral 117 denotes a rectifying circuit for rectifying the three-phase alternating current into direct current and having a diode group 117a and a capacitor 117b.

Figure 2:
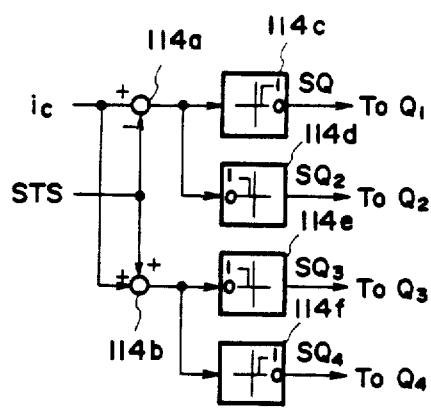
FIG. 2 is a block diagram of a principal portion of the arrangement of FIG. 1.
Figure 3:
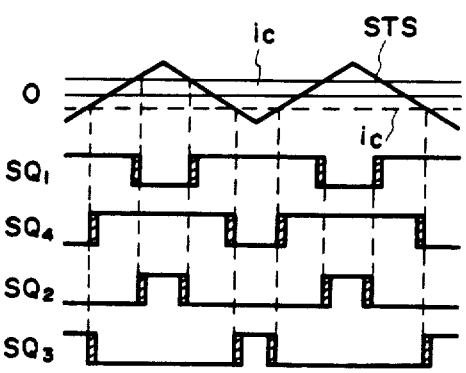
FIG. 3 illustrates waveforms associated with various portions of the arrangement of FIG. 2.

As shown in the block diagram of FIG. 2, the pulse-width modulating circuit 114 includes a subtracting circuit 114a for subtracting a sawtooth signal STS from the current command ic; an adding circuit 114b for adding the current command ic and the triangular signal STS together; and four comparator circuits 114c through 114f. The comparator circuits 114c and 114f generate "1" outputs if the respective input signals thereof are +Δ or greater, and generate "0" outputs if their respective input signals are less than +Δ. The comparator circuits 114d and 114e produce "1" outputs if the respective input signals thereof are less than −Δ, and produce "0" outputs if their respective input signals are −Δ or greater. Accordingly, when the current command ic and the triangular signal STS are related as shown in FIG. 3, the PWM circuit 114 operates to generate pulse-width modulated signals (hereafter referred to as PWM signals) SQ1, SQ2, SQ3, SQ4, which are the outputs of the respective comparator circuits 114c, 114d, 114e, 114f, as shown in FIG. 3. The width of the "1" level of each of the PWM waveforms SQ1, SQ2, SQ3, SQ4 is reduced by an amount equivalent to the shaded portions due to the abovementioned dead zone of the respective comparator circuits 114c through 114f.

Figure 4:
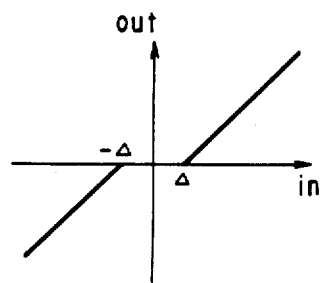
FIG. 4 illustrates an input/output characteristic of a PWM circuit.

The transistorized amplifier 115 includes a pair of serially connected transistors Q1, Q2, and a pair of transistors Q3, Q4 connected in parallel. Diodes D1 through D4 are provided for corresponding ones of the transistors Q1 through Q4. When transistors Q1 and Q4 turn on, a current flows in the direction of the arrow A to rotate the motor 110 in the forward (or reverse) direction. When transistors Q2, Q3 turn on, a current flows in the direction of the arrow B to rotate the motor 110 in the forward (or reverse) direction. The PWM signals SQ1, SQ2, SQ3, SQ4 are applied to the bases of respective transistors Q1, Q2, Q3, Q4. Accordingly, the shaded portions of the PWM signals SQ1 through SQ4 are deleted due to the dead zone Δ of the PWM circuit 114 such that transistors Q1 and Q2, as well as transistors Q3 and Q4, will not turn on simultaneously and create a short circuit. The input/output signal characteristic of the PWM circuit 114 will therefore have a dead zone ranging between Δ and −Δ, as shown in FIG. 4. Returning to FIG. 1, numeral 118 denotes a holding circuit for holding the current command ic. The output stage of this holding circuit includes a digital-to-analog converter. Numerals 119 and 120 denote analog-to-digital converters (A-D converters) for converting the analog values of the armature current Ic and actual velocity voltage TSA, respectively, into digital values.

The operation of the embodiment shown in FIG. 1 will now be described. Assume that a velocity command VCMD is increased when the motor 110 is rotating at a certain velocity. The velocity command VCMD arrives at the input/output port 113d. The processor 113a reads the velocity command VCMD from the input/output port 113d via the bus 113h. Meanwhile, the processor 113a reads, at a predetermined period, the actual velocity TSA of the tachogenerator 111 via the input/output port 113g and the armature current Ic via the input/output port 113f, and produces the current command ic by performing predetermined arithmetic operations in accordance with the motor control program store in the program memory 113b. Specifically, the processor 113a computes the difference between the velocity command VCMD (VC) and the actual velocity TSA (VA) to derive a velocity error ER (error calculation step). Next the processor performs a proportional integration operation in accordance with the following equation using the velocity error ER, thereby to calculate the amplitude Is of the armature current (proportional integration step):

$$\left. \begin{array}{l} Is = K1\,(Vc - Va) + K2\Sigma(Vc - Va) \\ \Sigma(Vc - Va) = \Sigma(Vc - Va) + (Vc - Va) \end{array} \right\} \quad (1)$$

When the load fluctuates or the velocity command changes, therefore, the velocity error ER (=Vc−Va) increases. There is also a corresponding increase in the amplitude Is of the armature current. As Is increases, the generated torque also increases to bring the actual velocity of the motor into conformance with the commanded velocity.

Next, the processor 113a subtracts the measured armature current Ic from the calculated Is to determine the current command ic (current command calculation step), and sends the current command to the input/output port 113e via the bus line 113h. The current command ic output from the input/output port 113e is delivered to the holding circuit 118 where it is held until the next current command ic is calculated.

The processor 113a executes the above-described calculations at predetermined intervals, and thus outputs the current command ic periodically. The current command ic is applied to the PWM circuit 114 having the aforementioned dead zone, and is converted into the PWM signals SQ1 through SQ4 which control the on/off action of the power transistors Q1 through Q4 of the transistorized amplifier circuit 115 in order to control the motor current. Since the processor 113a performs similar processing at predetermined intervals to produce the current command ic, the motor 110 will eventually rotate at the commanded velocity.

Figure 5:
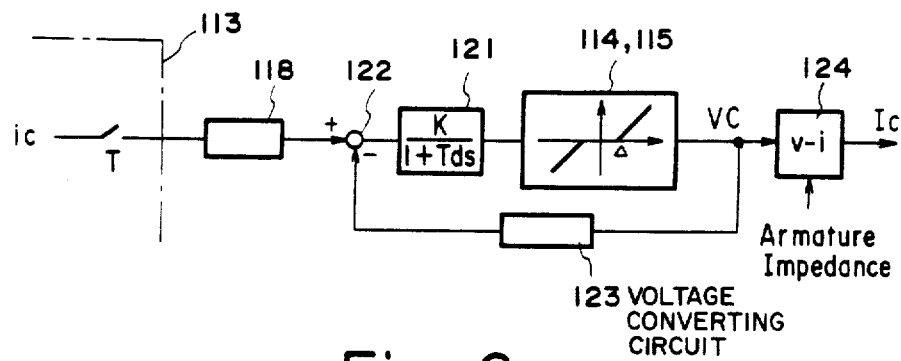
FIG. 5 is a block diagram of a system for eliminating dead zone.

Since the PWM circuit 114 has the aforementioned dead zone, the level "1" pulse width of the actual PWM signals SQ1 through SQ4 is reduced. Therefore, the current applied to the motor 110 is diminished by an amount corresponding to the dead zone and thus the required torque cannot be obtained. Accordingly, a compensating method illustrated in FIG. 5 which relies upon voltage feedback has previously been proposed. This previously proposed arrangement, employs (1) a voltage converting circuit 123 for generating an impressed voltage from an armature voltage Vc (2) a subtracting circuit 122 for calculating the difference between the output voltage of the holding circuit 118 and the output voltage of the voltage converting circuit 123; and (3) an integrating circuit 121 for integrating the difference generated by the subtracting circuit 122. This voltage feedback loop raises the system gain to compensate for the dead zone of the PWM circuit 114. Numeral 124 denotes a voltage-current converter for converting the output of the PWM circuit 114. This arrangement, however, requires circuits 121 through 123. Since these circuits are analog circuits, the arrangement is complicated and expensive despite the the use of the microprocessor.

Figure 6:
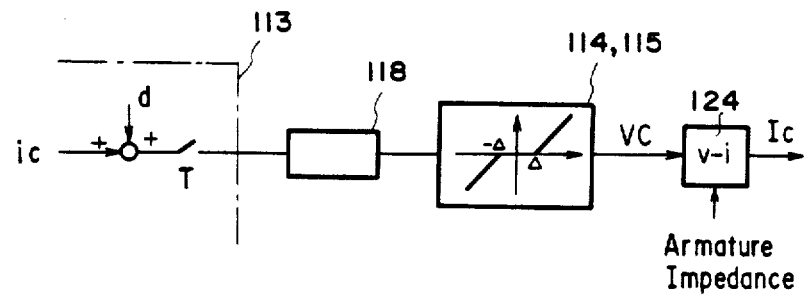
FIG. 6 is a block diagram of dead zone elimination according to the present invention.

According to the present invention, therefore, the design is such that dead zone compensation is performed by the arithmetic circuit 113, thereby dispensing with the circuits of the foregoing arrangement. Specifically, as shown in FIG. 6 which illustrates the principle of the present invention, the arithmetic circuit 113 adds a compensating signal d to the current command ic calculated in the current command calculation step, and applies the result to the holding circuit 118. The compensating signal d is determined in the following manner:

$$\left.\begin{array}{l}\text{when } i_c \geq 0 \text{ holds, } d = \Delta \\ \text{when } i_c < 0 \text{ holds, } d = -\Delta\end{array}\right\} \quad (2)$$

The dead zone $\Delta$ of the PWM circuit 114 is a known quantity. Therefore, by adding the compensating signal d to the current command ic, compensation can be effected in a manner such that the current command ic does not fall in a range within the dead zone ($\Delta$ through $-\Delta$).

Figure 7:
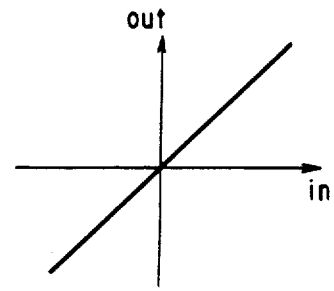
FIG. 7 illustrates an input/output characteristic of a PWM circuit according to of the present invention.

Thus, using this addition processing for the compensating signal d, the input/output characteristic of the PWM circuit 114 can be made linear and free of a dead zone, as shown in FIG. 7.

This result will now be described in connection with the embodiment of FIG. 1. The data memory 113dc stores the value of d as $\Delta$, $-\Delta$. After executing the above-described current command calculation in accordance with the motor control program of the program memory 113b, the processor 113a discriminates the sign of the calculated current command ic and reads $\Delta$ out of the data memory 113dc. Then, if ic$\geq$0 holds or $-\Delta$ if ic<0 holds, the processor adds the read compensating signal d to the current command ic (dead zone compensation step).

The compensated current command is then applied to the holding circuit 118 through the input/output port 113e to control the motor 110.

Though the foregoing description is for a case where the motor is a DC motor and DC drive is applied, the invention is also applicable to a case where an AC motor is driven.

Figure 8:
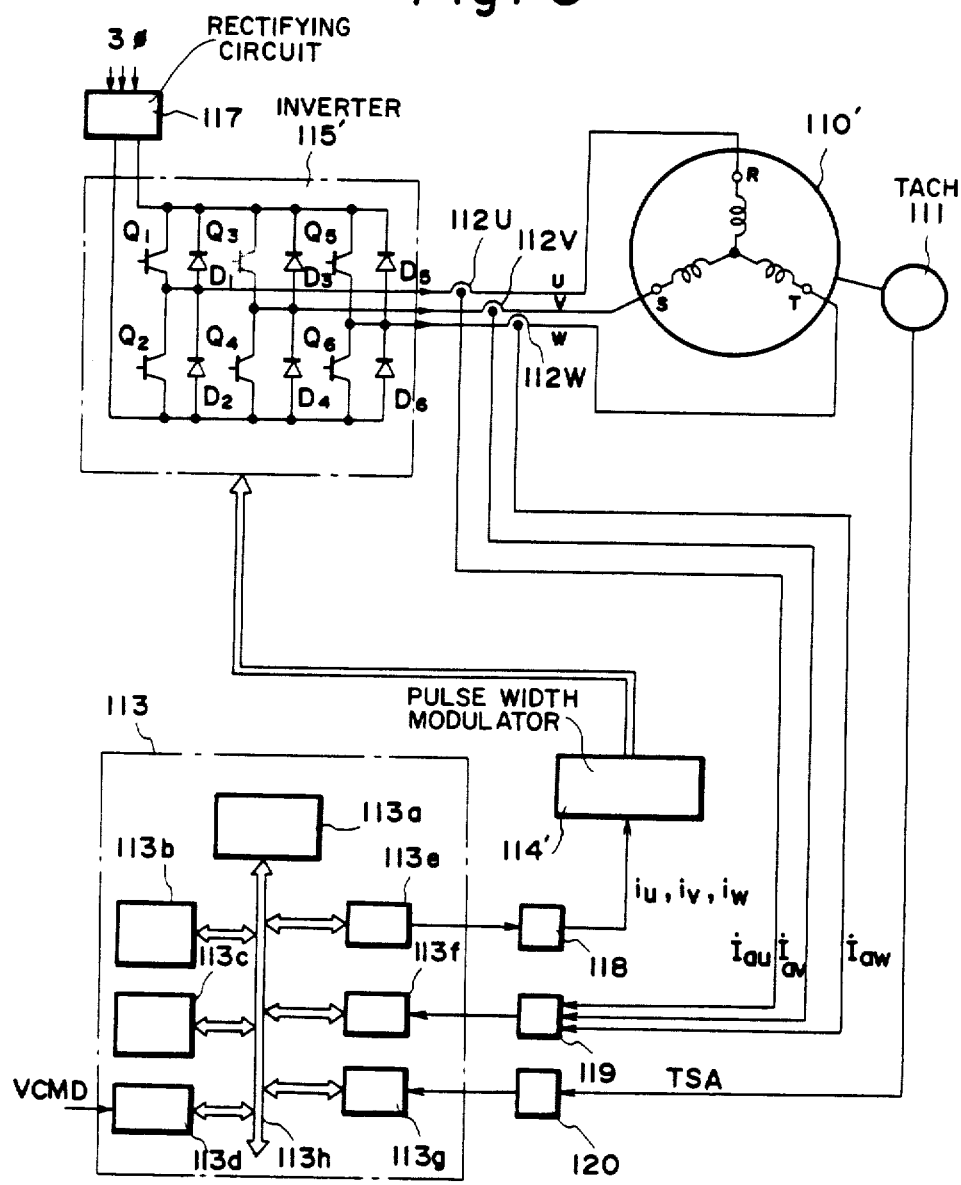
FIG. 8 is a block diagram of a second embodiment of the present invention.
Figure 9:
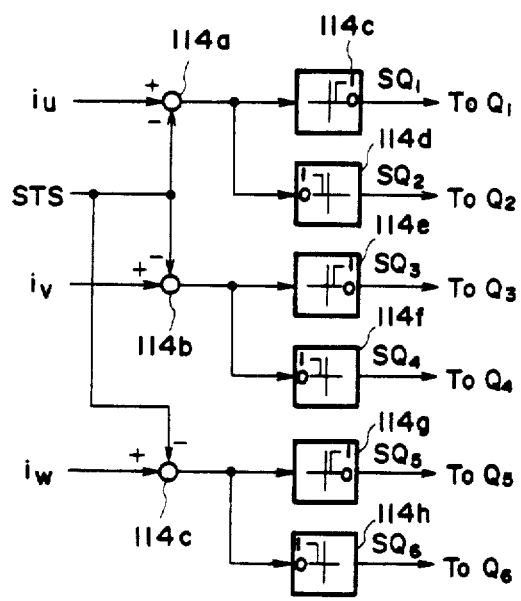
FIG. 9 is a block diagram of a principal portion of FIG. 8.

FIG. 8 is a block diagram of a second embodiment of the present invention in which the invention is applied to a three-phase AC motor. In the FIG. 8 numeral 110' denotes a three-phase AC motor, and numeral 115' designates an inverter (transistorized amplifier). The inverter includes power transistors Q1, Q2, Q3, Q4, Q5, Q6, with two transistors being serially connected in each phase, and diodes D1 through D6 connected to respective ones of the power transistors Q1 through Q6. Numeral 117 denotes a rectifying circuit the construction whereof is similar to that of FIG. 1. Numeral 114' represents a PWM circuit. As shown in FIG. 9, the PWM circuit includes subtracting circuits 114a, 114b, 114c for subtracting the triangular signal STS from current commands iu, iv, iw which are produced as outputs by the arithmetic circuit 113 for the respective phases; comparators 114c, 114e, 114g for producing a level "1" if the respective comparator input signals are $+\Delta$ or greater and level "0" if their respective input signals are less than $+\Delta$; and comparator circuits 114d, 114f, 114h for producing a level "0" if the respective comparator input signals are $-\Delta$ or greater and a level "0" if their respective input signals are less than $-\Delta$. The comparator circuits 114c through 114h produce PWM signals SQ1 through SQ6 for the power transistors Q1 through Q6. The PWM signals SQ1, SQ2; SQ3, SQ4; SQ5, SQ6 are of opposite phase, just as SQ1 and SQ2 in FIG. 3, and have narrowed pulse widths due to the dead zones of the comparator circuits, as in FIG. 3. It should be noted that the holding circuit 118 comprises three registers 118a, 118b, 118c so as to hold the current commands iu, iv, iw of the respective phases.

Figure 10:
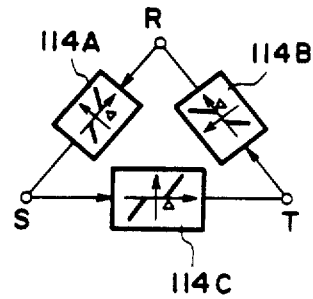
FIGS. 10, 11 and 12 are block diagrams illustrating the principle of the present invention.

Before describing the operation of the embodiment shown in FIG. 8, the dead zone compensating principle of the present invention will be explained. If the star connection of the AC motor shown in FIG. 8 is converted into a delta connection, then the arrangement will be as shown in FIG. 10, with dead zones 114A, 114B, 114C of the PWM circuit being inserted between adjoining phases so that a dead zone is produced near the zero point of the current commands producing interphase voltages. If we let the R-S interphase voltage be $R_S$, the S-T interphase voltage be $S_T$, the T-R interphase voltage be $T_R$ and the voltages of the respective phases be $R_V$, $S_V$, $T_V$, then the following equations will hold:

$$\left.\begin{array}{l}R_S = R_V - S_V \\ S_T = S_V - T_V \\ T_R = T_V - R_V\end{array}\right\} \quad (3)$$

Figure 11:
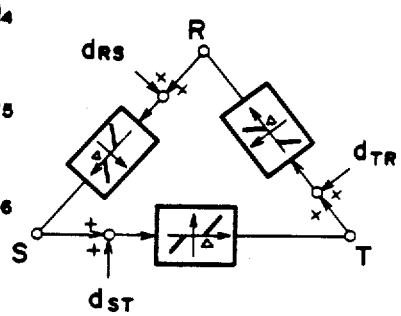

If the present invention is now applied to these signals, good results are obtained when compensating signals dRS, dST, dTR are added between phases, as shown in FIG. 11. The compensating signals are as follows:

$$\left.\begin{array}{l}R_S \geq 0 \ldots d_{RS} = \Delta, \ R_S < 0 \ldots d_{RS} = -\Delta \\ S_T \geq 0 \ldots d_{ST} = \Delta, \ S_T < 0 \ldots d_{ST} = -\Delta \\ T_R \geq 0 \ldots d_{TR} = \Delta, \ T_R < 0 \ldots d_{TR} = -\Delta\end{array}\right\} \quad (4)$$

Figure 12:
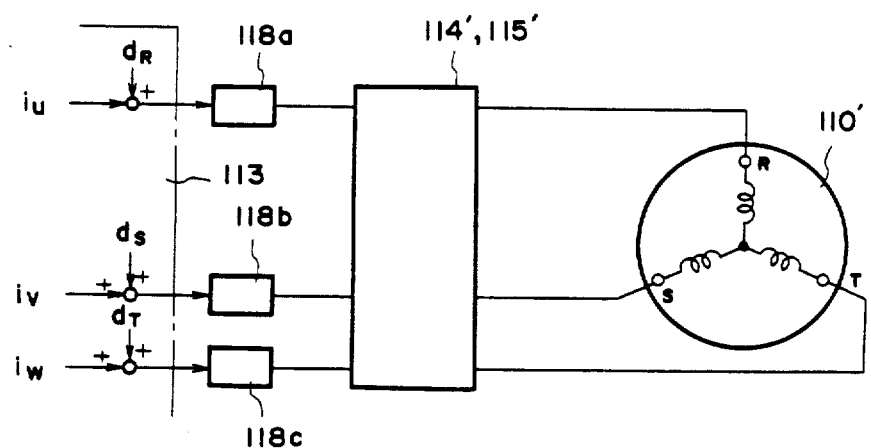

In actuality, the arithmetic circuit 113 commands the armature winding terminal voltages for the respective phases. Therefore, as shown in FIG. 12, the following compensating signals $d_R$, $d_S$, $d_T$ should be respectively applied to the current commands iu, iv, iw in the U(R), V(S), W(T) phases:

$$\left.\begin{array}{l}d_R = d_{RS} - d_{TR} \\ d_S = d_{ST} - d_{RS} \\ d_T = d_{TR} - d_{ST}\end{array}\right\} \quad (5)$$

The operation of the arrangement embodied in FIG. 8 will now be described. The processor 113a calculates the difference between the velocity command VCMD and the actual velocity TSA generated by the tachogenerator 111; calculates the velocity error ER in a manner similar to that described in connection with FIG. 1; then executes the abovementioned proportional integration step and calculates the amplitude Is. Next, the processor 113a reads sine wave and cosine wave patterns stored in the data memory 113c; multiplies these by the amplitude Is to digitally generate two-phase AC signals Ila, Ilb; and performs the following calculations to generate three-phase current commands Iu, Iv, Iw:

$$i_u = i_{Ia} \quad (6)$$

$$i_v = -\frac{1}{2} i_{Ia} + \frac{3}{2} i_{Ib}$$

$$i_w = -\frac{1}{2} i_{Ia} - \frac{3}{2} i_{Ib}$$

As in the above-described current command calculation step, the processor 113a subtracts phase currents Iau, Iav, Iaw; read from current transformers 112U, 112V, 112W), from the obtained three-phase current commands Iu, Iv, Iw, to generate current commands iu, iv, iw.

Thereafter, the processor 113a determines, from the current commands iu, iv, iw, the signs of the interphase voltages $R_S$, $S_T$, $T_R$, and then reads in accordance with the signs the compensation signals, $d_{RS}$, $d_{ST}$, $d_{TR}$ which are stored in the data memory 113c. The processor next executes the calculations of Eq. (5) to generate the compensating signals $d_R$, $d_S$, $d_T$, and adds these to the current commands iu, iv, iw. The compensated current commands iu, iv, iw are applied to the holding circuits 118a, 118b, 118c via the bus 113h and input/output port 113e. Thus, the PWM circuit 114' generates the PWM signals SQ1 through SQ6 to control the power transistors Q1 through Q6 of the inverter 115' so that the AC motor 110' is rotated at the commanded velocity.

The present invention as described above is applied to an arrangement having a PWM circuit with a dead zone and a transistorized amplifier/inverter includes, an arithmetic circuit for generating a current command and adding to this command a compensating signal which is capable of offsetting the dead zone of the PWM circuit. The compensated command is applied to a holding circuit. Accordingly, it is possible to prevent motor torque loss ascribable to the influence of the dead zone of the PWM circuit. In order to eliminate this torque loss ascribable to the dead zone, no special analog circuitry is necessary. Instead, compensation can be performed by addition processing performed by an arithmetic circuit and the through use of a microprocessor, therefore, the arrangement is simplified and costs can be reduced.

The input/output port 113e of FIG. 8 may consist of a counter, a three-phase AC signal in the form of a digital value delivered to the counter via the bus 113h, and the pulse-width modulated signal produced by the counter. When pulse-width modulation is carried out, an arrangement may be adopted wherein a digital integrated circuit equipped with a clock oscillator is used in order to drive an up/down counter, and a programmable read-only memory responds to the up/down counter to generate a digital output signal proportional to a pulse-width modulated drive signal requested for a power stage, whereby a DC voltage is directly converted in digital fashion into an AC output waveform without using an AC reference waveform. Such an arrangement is disclosed in, e.g., Japanese Patent Application Laid-Open No. 53-48449. In such case, the pulse-width modulated signal is applied to the base drive circuit to control the inverter. It should be noted that the present invention is not limited to the above-described embodiments but can be modified in various ways in accordance with the gist thereof, and that such modifications will not depart from the scope of the claim.

According to the present invention, the motor control losses attributable to the dead zone of a PWM circuit provided which is intended to prevent short circuits in an inverter circuit are offset, whereby loss of motor torque due to the influence of the dead zone can be prevented. The invention therefore is well-suited for application to the field of motor control.

We claim:

1. A motor control apparatus including:
   pulse-width modulating means having a dead zone, for receiving a control input signal and for pulse-width modulating said control input signal;
   amplifying control means for controlling the motor in accordance with said pulse-width modulated control input signal;
   arithmetic circuit means for receiving a command signal indicating a desired motor velocity, for calculating a current command in accordance with said command signal, the current command having a polarity, and for generating said control input signal by modifying said current command signal by a predetermined amount in accordance with the polarity of the current command signal so as to compensate for said dead zone of said pulse-width modulating means; and
   holding circuit means, operatively connected between said pulse-width modulating means and said arithmetic circuit means, for holding said control input signal.

2. A motor control apparatus according to claim 1, wherein said arithmetic circuit means includes a data memory means for storing said predetermined amount.

3. A motor control apparatus according to claim 1, wherein said amplifying control means includes a transistorized amplifier circuit.

4. A motor control apparatus for controlling the velocity of a motor, said apparatus comprising:
   inverter means for controlling the velocity of the motor in accordance with a pulse-width modulated signal;
   pulse width modulator means having a dead zone with a specified width, for receiving a control signal and for generating said pulse-width modulated signal;
   holding circuit means for receiving said control signal, for storing said control signal and for providing said control to said pulse width modulating means; and
   arithmetic means for receiving a motor velocity command, an actual velocity signal indicating the actual velocity of the motor, and an armature current signal indicating armature current of the motor, said arithmetic means including
      data memory means for storing compensation signals representing the width of said dead zone;
      calculating means for calculating a polarity and magnitude of an armature current in accordance with said actual velocity signal, said velocity command and said armature current signal;
      determining means for determining one of said compensation signals stored in said data means in accordance with said polarity of said calculated armature current; and
      compensating means for compensating said armature current in accordance with said one of said compensation signals and for providing said control signal corresponding to said compensated armature current.

5. A motor control apparatus according to claim 4, wherein said calculating means comprises means for calculating $$Is = K1(Vc - Va) + K2\Sigma(Vc - Va)$$

$$\Sigma(Vc - Va) = \Sigma(Vc - Va) + (Vc - Va)$$

wherein Is corresponds to said calculated armature current, K1 and K2 are constants of proportionality, $V_c$ corresponds to said velocity command and Va corresponds to said actual velocity signal.

6. A motor control apparatus according to claim 4, wherein said motor is a three-phase motor and said data memory stores data representing sine and cosine wave patterns, and wherein said calculating means includes means for calculating an armature current for each of said three phases of the motor in accordance with said sine and cosine patterns.

* * * * *

UNITED STATES PATENT AND TRADEMARK OFFICE
CERTIFICATE OF CORRECTION

PATENT NO. : 4,719,400

DATED : Jan. 12, 1988

INVENTOR(S) : Kurakake et al.

It is certified that error appears in the above-identified patent and that said Letters Patent is hereby corrected as shown below:

```
Front page [57], line 11, after "signal" delete ",".
Col. 2, line 27, delete "of";
        line 67, after "includes" insert --:--.
Col. 3, line 65, "(VA)" s/b --(Va)--.
Col. 4, line 46, after "Vc" insert --;--;
        line 58, delete "the" (first occurrence).
Col. 5, line 26, after "processor" insert --then--;
        line 55, after "and" insert --a--.
Col. 6, line 58, equation (6), first line, "Iu" s/b --Iu--;
                                second line, "Ila" s/b --Ila--.
        line 68, change ";" to --(--.
Col. 8, line 41, after "including" insert -- -- --.
```

Signed and Sealed this

Twenty-first Day of June, 1988

Attest:

*Attesting Officer*

DONALD J. QUIGG

*Commissioner of Patents and Trademarks*